United States Patent
Tseng

[19]

[11] Patent Number: 5,984,335
[45] Date of Patent: Nov. 16, 1999

[54] CRANK ASSEMBLY FOR AN ELECTRICAL BICYCLE

[75] Inventor: Diing-Huang Tseng, Changhua Hsien, Taiwan

[73] Assignee: Merida Industry Co., Ltd, Changhua Hsiang, Taiwan

[21] Appl. No.: 08/949,341

[22] Filed: Oct. 14, 1997

[51] Int. Cl.$^6$ ........................................ B62M 1/04
[52] U.S. Cl. ................ 280/253; 280/252; 180/206; 180/207
[58] Field of Search .................. 280/252, 253, 280/255, 258; 180/205, 206, 207; 74/594.1

[56] References Cited

U.S. PATENT DOCUMENTS

| | | | |
|---|---|---|---|
| 4,178,807 | 12/1979 | Young | 74/217 B |
| 5,335,927 | 8/1994 | Islas . | |
| 5,716,069 | 2/1998 | Bezerra et al. | 280/254 |
| 5,829,546 | 11/1998 | Tseng | 180/206 |
| 5,833,257 | 11/1998 | Kohlheb et al. | 280/251 |
| 5,845,727 | 12/1998 | Miyazawa et al. | 180/205 |
| 5,860,329 | 1/1999 | Day | 74/594.1 |

FOREIGN PATENT DOCUMENTS

| | | |
|---|---|---|
| 2498549 | 1/1981 | France . |
| 2513207 | 9/1981 | France . |

OTHER PUBLICATIONS

Patent Abstracts of Japan, vol. 097, No. 005, May 30, 1997 & JP 09 002369 A (Hokuto Seisakusho:KK), Jan. 7, 1997.
Patent Abstracts of Japan, vol. 097, No. 001, Jan. 31, 1997 & JP 08 230756 A (Tokico Ltd), Sep. 10, 1996.
Patent Abstracts of Japan, vol. 096, No. 008, Aug. 30, 1996 & JP 08 091280 A (Suzuki Motor Corp.), Apr. 9, 1996.
English translation of claims of French reference No. 2,513,207.
English translation of claims of French reference No. 2,498,549.

*Primary Examiner*—Robert J. Oberleitner
*Assistant Examiner*—Michael Cuff
*Attorney, Agent, or Firm*—Kirkpatrick & Lockhart LLP

[57] ABSTRACT

A crank assembly for an electrical bicycle includes a crank axle with two uni-directional bearings respectively and securely mounted to two ends thereof, each one of the uni-directional bearings securely connected to a respective one of two torque members and each of the torque members having an extending portion extending therefrom. Two crank arms are respectively and rotatably mounted to the two base portions. Each one of the crank arms has a recess defined therein so that a distal end of the corresponding extending portion is securely positioned in a periphery defining the recess. A detection device is disposed to each of the two crank arms and is located beside the extending portion corresponding thereto.

5 Claims, 5 Drawing Sheets

CRANK ASSEMBLY FOR AN ELECTRICAL BICYCLE

BACKGROUND OF THE INVENTION

1. Field of the Invention

The present invention relates to a crank assembly for an electrical bicycle and, more particularly, to a crank assembly which is operated by reciprocatedly pivoting approximately 60 degrees about a crank axle of the bicycle.

2. Brief Description of the Prior Art

FIG. 5 shows a side elevation view of a prior art electrical bicycle which is driven by a motor 81 powered by a set of batteries 80 disposed on a down tube 70 of the bicycle. A crank assembly including two crank arms 60 each with a pedal disposed thereto transversely extends through a bottom bracket of the bicycle so that a rider rotating the crank arms 60 cooperated with the motor 81 will ride the bicycle with less effect. Referring to FIG. 6, in order to move the bicycle forward, the crank arms 60 have to be rotated 360 degrees. A suitable length of each one of the crank arms 60 is 170 mm and a minimum distance measured from the lowermost pedal to the ground is 120 mm. When the bicycle is ridden round a corner and tilts accordingly, the bicycle has an inclined angle "A" of 26 degrees regarding to a vertical plane passing through two points where two tires contact the ground. This inclination also limits the length of the crank arm 60 as a longer crank arm will hit the road surface. However, the shorter the crank arms 60 are, the more force should be applied by the rider to rotate them. Furthermore, the location of the set of batteries 80 increases a distance measured from a top of the set of the batteries 80 to the ground so that it would be inconvenient for the rider to move his/her leg across the set of batteries 80 and sit on a seat 82 of the bicycle.

The present invention intends to provide an improved crank assembly for an electrical bicycle to mitigate and/or obviate the above-mentioned problems.

SUMMARY OF THE INVENTION

The present invention provides a crank assembly for an electrical bicycle including a seat tube and two chain stays, comprising a crank axle having two uni-directional bearings respectively and securely mounted to two ends thereof, each one of the uni-directional bearings securely connected to a respective one of two torque members each of which has a base portion securely mounted to the respective uni-directional bearing and an extending portion extending from the base portion. Two crank arms are rotatably mounted to the respective two base portions and each have a recess defined therein so that a distal end of the extending portion received therein is securely positioned in a periphery defining the recess. Each one of the two crank arms has a detection means disposed thereto which is located beside the extending portion corresponding thereto.

It is an object of the present invention to provide a crank assembly for an electrical bicycle and two crank arms of the assembly are operated within a limited angle.

It is another object of the present invention to provide a crank assembly for an electrical bicycle and two crank arms of the assembly are longer than conventional crank arms of a bicycle.

It is a further object of the present invention to provide a crank assembly for an electrical bicycle and two crank arms of the assembly each have a torque member with is detected by a detection means.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
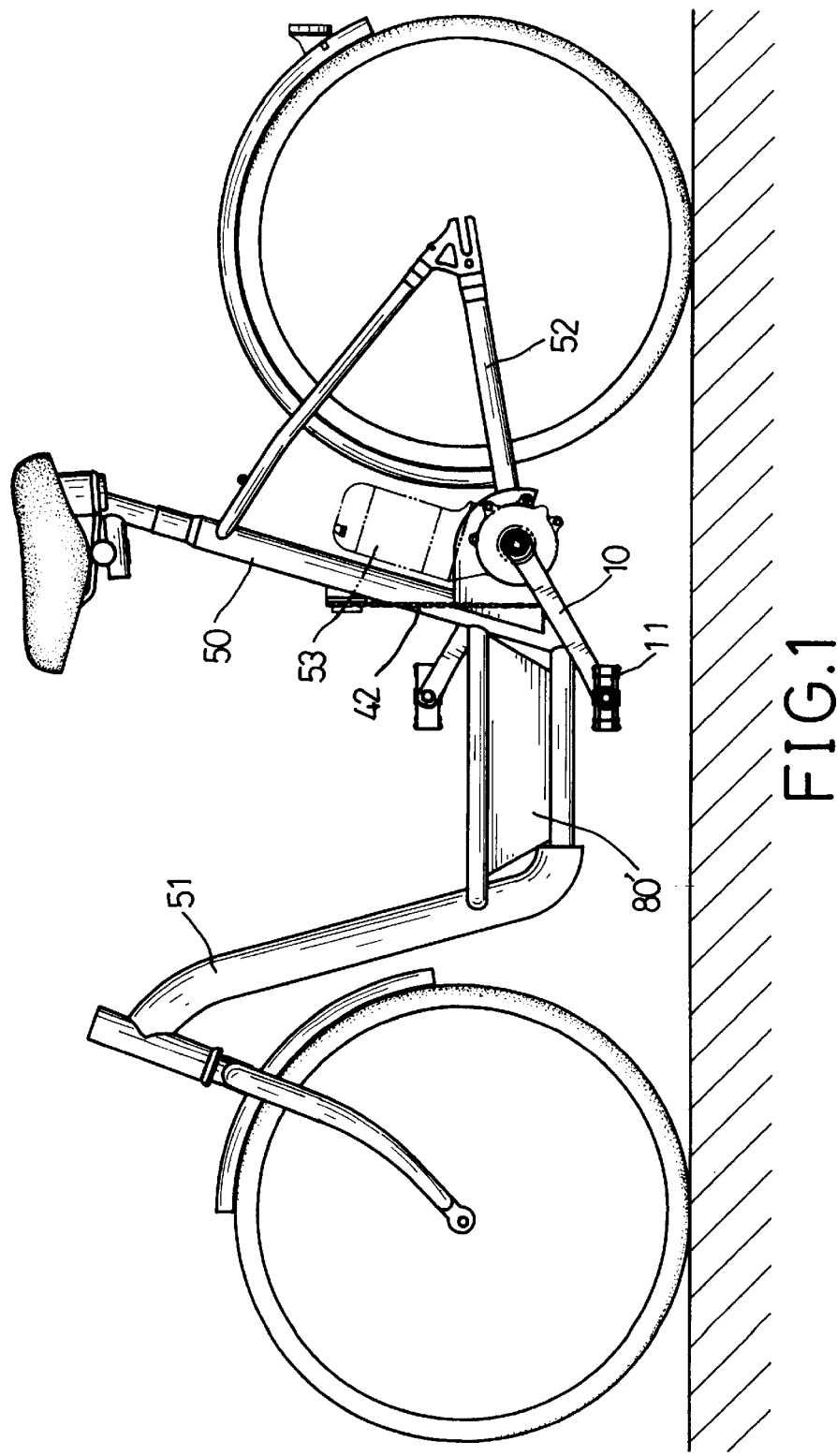
FIG. 1 is a side elevational view of an electrical bicycle with a crank assembly of the present invention.
Figure 2:
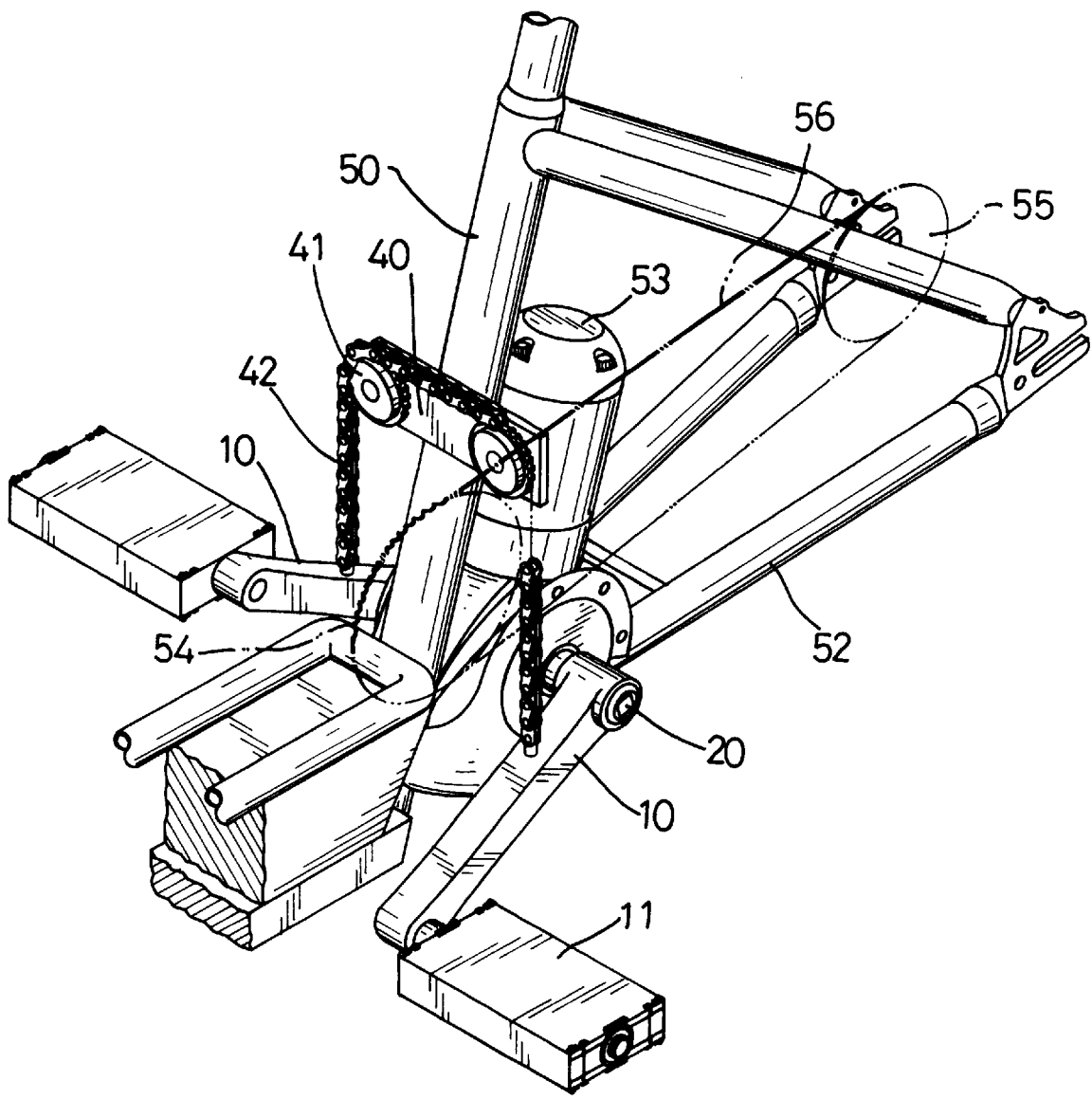
FIG. 2 is a perspective view of the crank assembly in accordance with the present invention.
Figure 4:
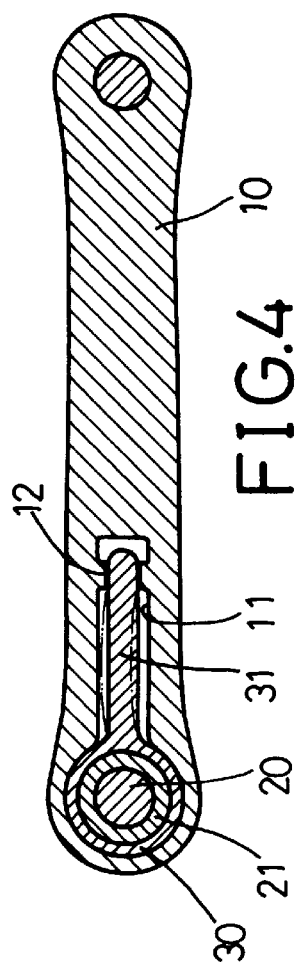
FIG. 4 is a side elevational view, partly in section, of one crank arm of the crank assembly to show a torque member disposed thereto.
Figure 3:
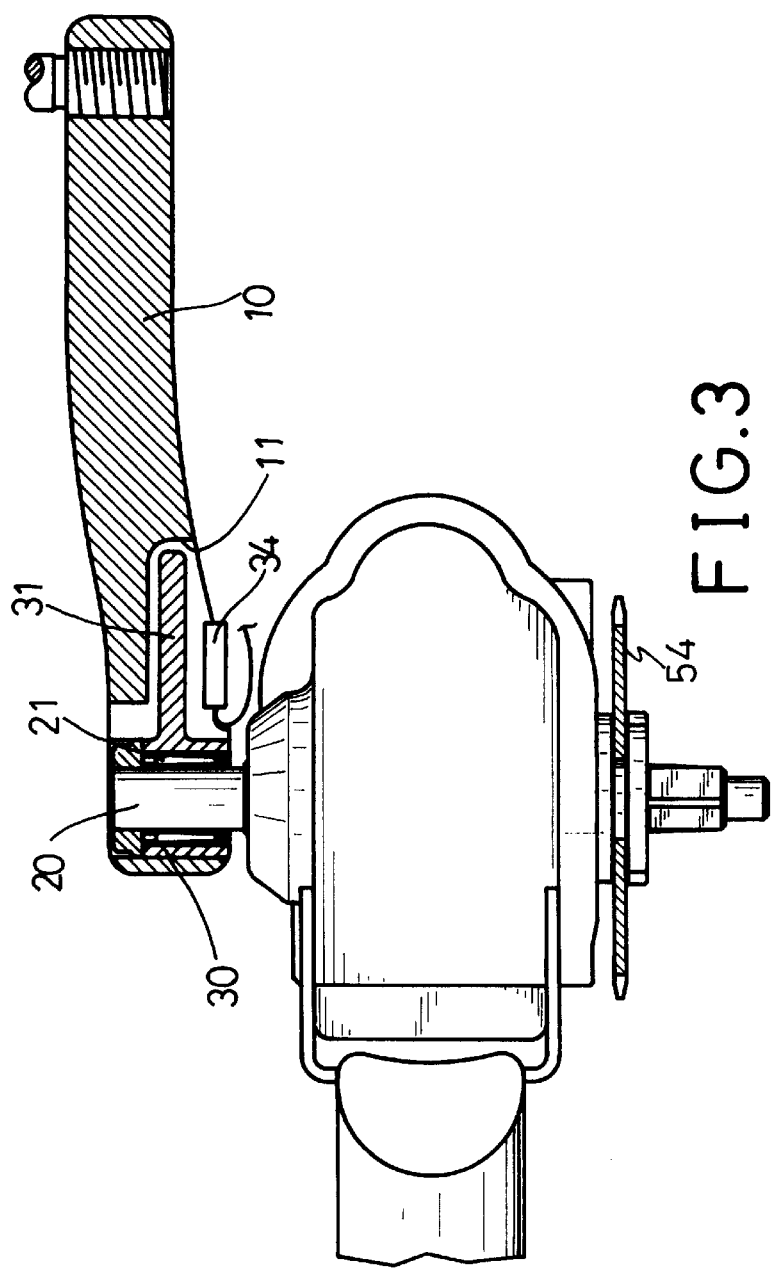
FIG. 3 is top plan view, partly in section, of the crank assembly in accordance with the present invention.

Referring to FIGS. 1 through 4, an electrical bicycle generally has a frame including a seat tube 50, two chain stays 52, a battery set 80' disposed between the seat tube 50 and a downtube 51, and a motor 53 disposed to a rear side of the seat tube 50 and driving a crank assembly in accordance with the present invention, wherein the crank assembly is disposed transversely between the two chain stays 52. The crank assembly of the present invention generally includes a crank axle 20 having two unidirectional bearings 21 respectively and securely mounted to two ends thereof. Each one of the unidirectional bearings 21 is securely connected to a respective one of two torque members each of which has a base portion 30 securely mounted to the respective uni-directional bearing 21 and an extending portion 31 extending from the base portion 30.

Two crank arms 10 are rotatably mounted to the respective two base portions 30, each one of the crank arms 10 having a recess 11 defined therein. A periphery defining the recess 11 has two protrusions 12 extending from two opposite inner sides thereof so as to securely position a distal end of the extending portion 31 therebetween. Each one of the two crank arms 10 has a detection means 34 disposed thereto which is located beside the extending portion 31 corresponding thereto.

A front sprocket 54 is disposed to one of two ends of the crank axle 20 and a rear sprocket 55 is disposed to one of two ends of a rear axle (not shown) so that a chain 56 is meshed with the front and the rear sprocket 54, 55. When alternatively pivoting the crank arms 10, the two unidirectional bearings 21 together with the front sprocket 54 are therefore rotated toward a pre-determined direction so as to rotate the rear sprocket 55 via the chain 56 to let the bicycle be moved forward. In the meanwhile, when the crank arms 10 are pivoted, the extending portions 31 will be deformed slightly owing to a torque from a user (not shown) stepping on pedals 11 disposed to the crank arms 10. A signal will be sent by the detection means 34 to a controller (not shown) to drive the motor 53 according to a deformation detected by the detection means 34.

A connecting device is connected between the two crank arms 10 so as to limit an angle between the two crank arms 10 when in operation. The connecting device includes a plate 40 disposed to the seat tube 50 of the bicycle, two gears 41 rotatably disposed to the plate 40, and a chain 42 engaged with the two gears 41 and connected between the two crank arms 10. Therefore, the two crank arms 10 are allowed to be rotated within a limited angle, that is to say, when one of the crank arms 10 is raised, the other crank arm 10 is lowered according to a length of the chain 42. Preferably, a maximum angle about 60 degrees between the two crank arms 10 is set so as to achieve an effort-reducing function.

Figure 5:
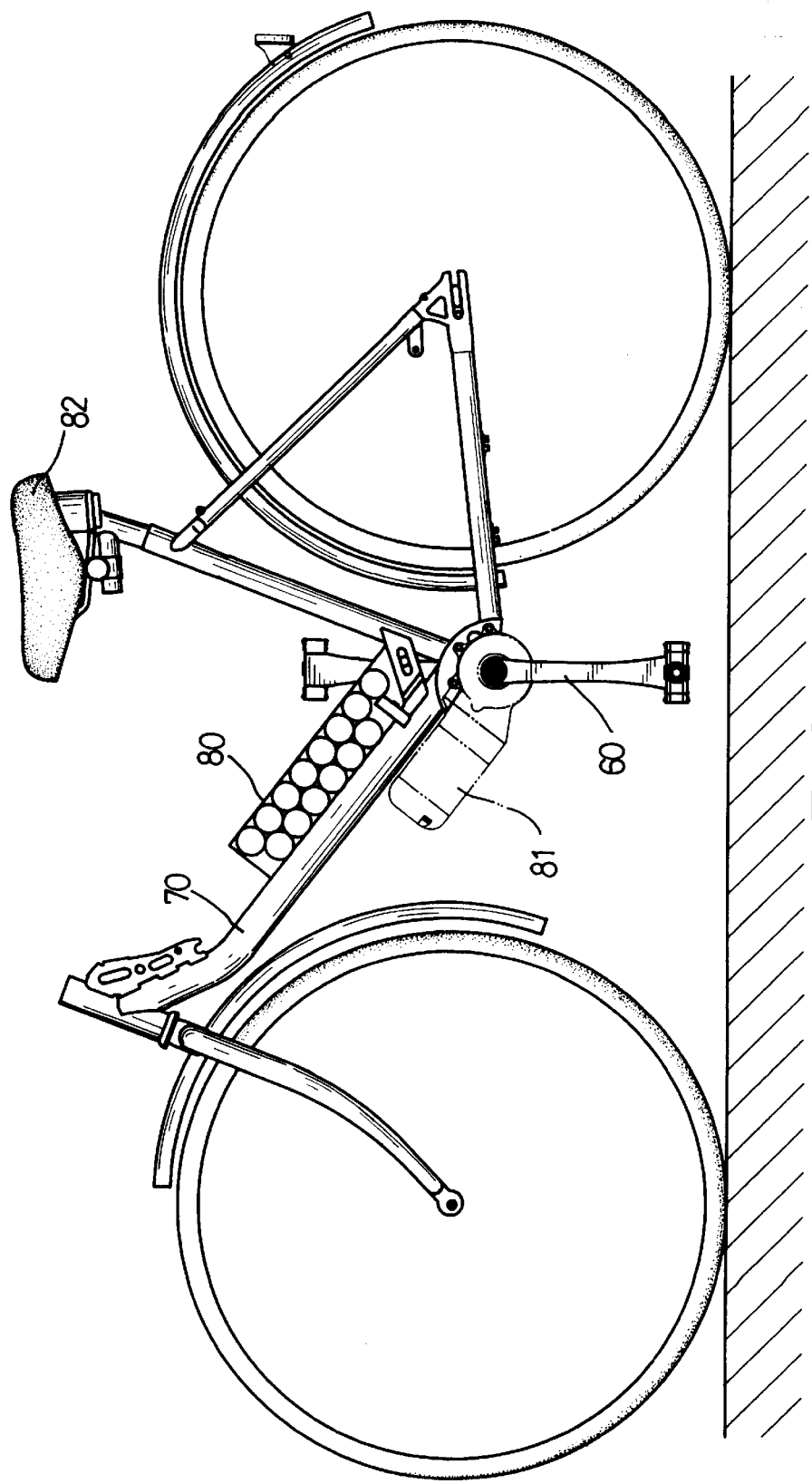
FIG. 5 is a side elevational view of a conventional electrical bicycle.
Figure 6:
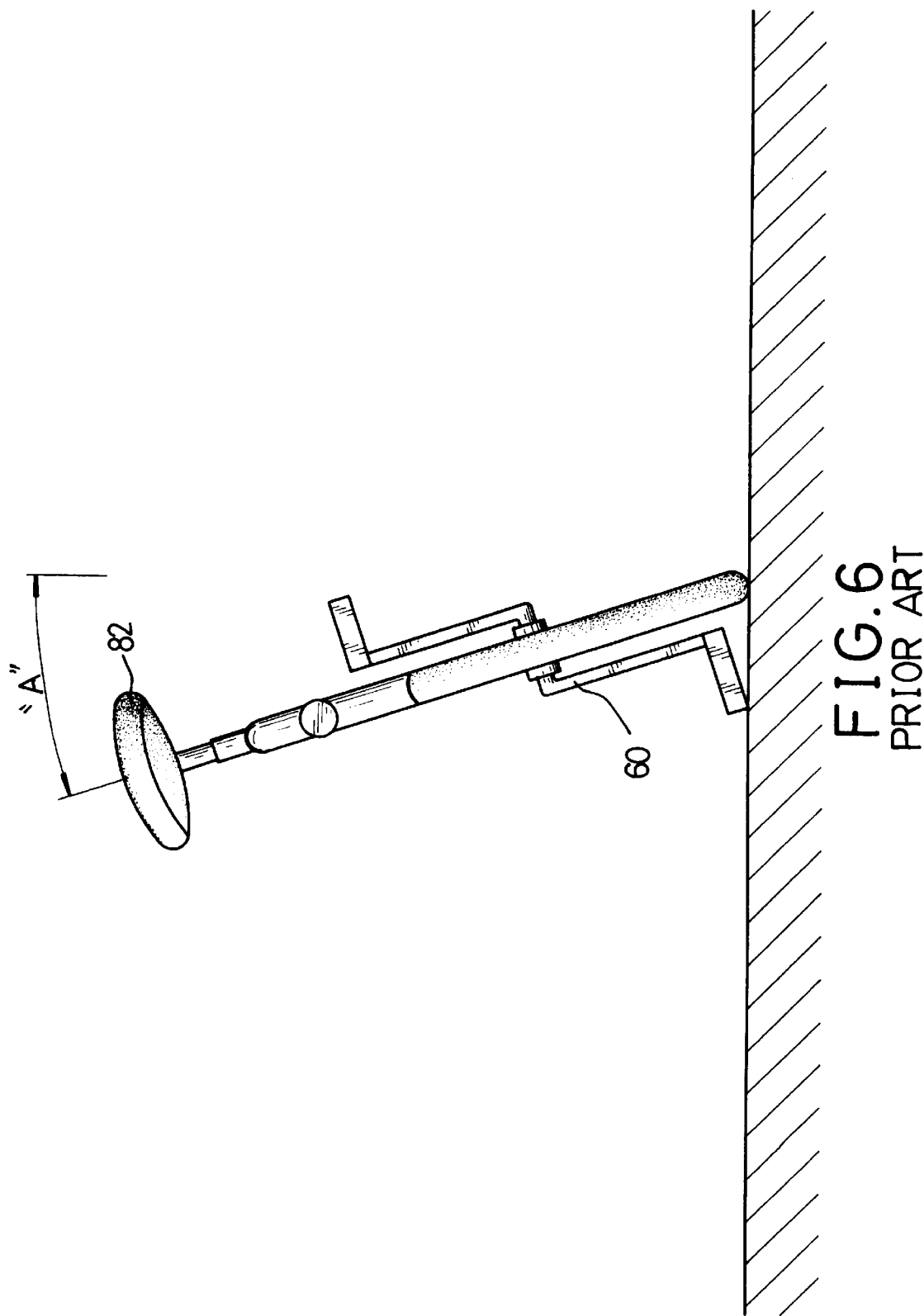
FIG. 6 is an illustrative view to show an angle related to a vertical plane passing through two points where two tires contact the ground, when the bicycle is turning a corner.

It is to be noted that the crank assembly is disposed near a rear wheel of the bicycle so that a length of the crank arm 10 can be longer than the conventional one such that a larger torque can be easily reached. The location of the battery set 80' is lower than that shown in FIG. 5 so that it is easier to get on the bicycle. Furthermore, because the crank arms 10 will not be rotated 360 degrees, a height from the crank axle 20 to the ground can be reduced if needed.

Although the invention has been explained in relation to its preferred embodiment, it is to be understood that many other possible modifications and variations can be made without departing from the spirit and scope of the invention as hereinafter claimed.

What is claimed is:

1. A crank assembly for an electrical bicycle including a seat tube and two chain stays, comprising:

a crank axle having two uni-directional bearings respectively and securely mounted to two ends thereof, each one of said uni-directional bearings securely connected to a respective one of two torque members each of which has a base portion securely mounted to said respective uni-directional bearing and an extending portion extending from said base portion, and two crank arms rotatably mounted to said respective two base portions, each one of said crank arms having a recess defined therein and a distal end of said extending portion received therein being securely positioned in a periphery defining said recess, each one of said two crank arms having a detection means disposed thereto which is located beside said extending portion corresponding thereto.

2. The crank assembly as claimed in claim 1 wherein at least one connecting device is connected between said two crank arms so as to limit a maximum angle between said two crank arms when in operation.

3. The crank assembly as claimed in claim 2 wherein said connecting device includes a plate adapted to be disposed to said seat tube of said bicycle and two gears are rotatably disposed to said plate, a chain engaged with said two gears and connected between said two crank arms.

4. The crank assembly as claimed in claim 1 wherein said crank axle is adapted to be transversely disposed between said chain stays of said bicycle.

5. The crank assembly as claimed in claim 1 wherein said periphery defining said recess has two protrusions respectively extending from two opposite inner sides thereof so as to securely position said distal end of said extending portion therebetween.

* * * * *